(No Model.)

W. H. RICHARDS.
APPARATUS FOR USE IN DEHORNING CATTLE.

No. 371,477. Patented Oct. 11, 1887.

Witnesses.
L. E. Smith
O. H. Wood

Inventor:
Wm. H. Richards
C. A. Snow & Co.
Attys.

N. PETERS, Photo-Lithographer, Washington, D. C.

UNITED STATES PATENT OFFICE.

WILLIAM H. RICHARDS, OF ORLEANS, IOWA.

APPARATUS FOR USE IN DEHORNING CATTLE.

SPECIFICATION forming part of Letters Patent No. 371,477, dated October 11, 1887.

Application filed June 2, 1887. Serial No. 240,566. (No model.)

*To all whom it may concern:*

Be it known that I, WILLIAM H. RICHARDS, of Orleans township, Winneshiek county, Iowa, have invented a new and useful Apparatus for use in Dehorning Cattle, of which the following is a full and exact description.

My invention is an improved apparatus for holding cattle while being dehorned; and it consists in certain novel features, hereinafter described and claimed.

Figure 1:
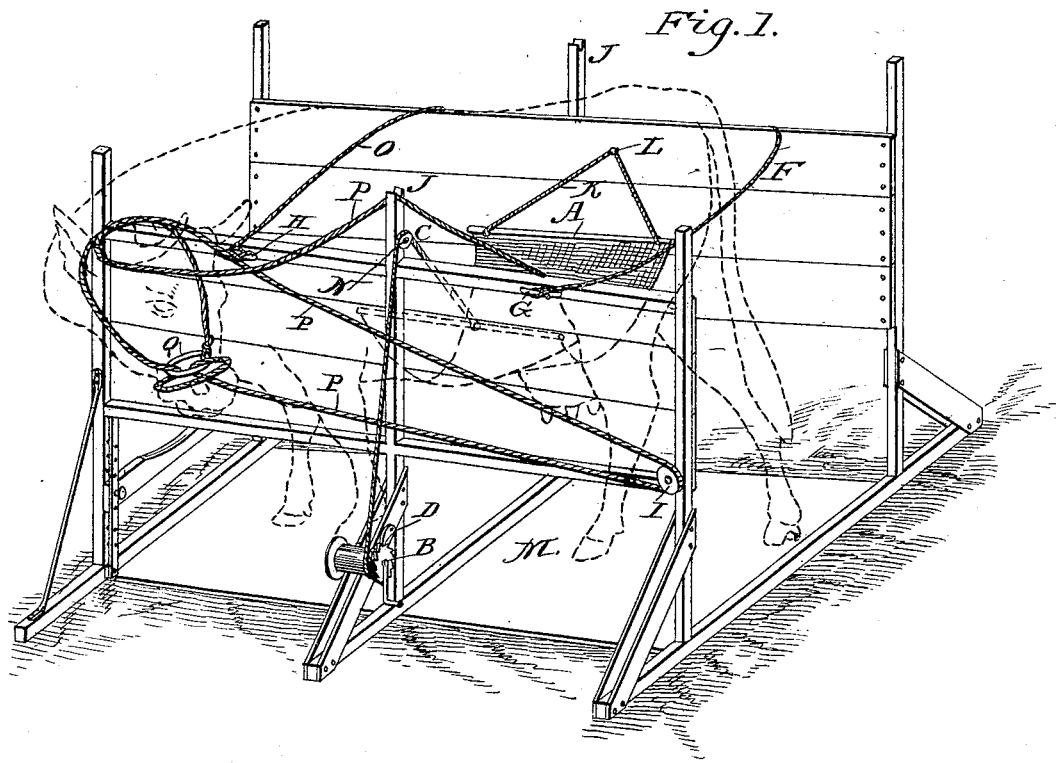
Figure 2:
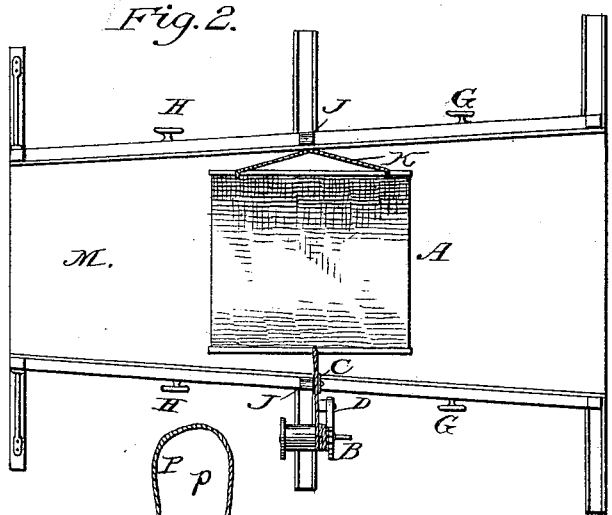
Figure 3:
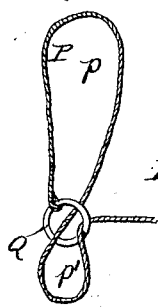

In the annexed drawings, Figure 1 is a perspective view of my improved machine, the position in which the animal is held being indicated by dotted lines. Fig. 2 is a plan view of the machine, and Fig. 3 is a detail view.

Referring to the drawings by letter, A designates an apron or belly-band, of canvas or analogous material, which is provided with a supporting-loop, K, at one end and a drawing-rope, C, at its other end. The supporting-loop K is caught over a pin or hook, L, on the side of the pen or stall M, while the rope C passes over a pulley, N, at the upper edge of the pen, on the side opposite the hook L, and then down to a windlass, B, which is prevented from retrograde movement by a pawl, D, which engages the usual ratchet-wheel on the end of the windlass.

G H designate cleats secured on the outer faces of the sides of the pen, at or near the upper edges of the same, and F O designate ropes, which are secured to the pins G H, respectively.

P designates a rope provided with a ring, Q, at one end and having its other end free to be grasped by the operator. This rope P is passed around a pulley, I, at the end of the pen, and is formed into the loops $p\ p'$ by being passed through the ring Q, as shown in Fig. 3.

In practice the animal is driven into the pen and the belly-band is drawn up close against and partially around the animal's body. The rope F is then secured to and between the pins G, and drawn tightly across or in rear of the animal's body, and the rope O is secured to and between the cleats H and drawn closely across the animal's shoulders. The animal is thus held firmly and securely in the pen. The rope P is now drawn over the animal's head, the loop $p'$ passing around the nose and the loop $p$ back of the ears, the free end of the rope passing over the notched post J. The said free end of the rope is then grasped by the operator's assistant and the animal's head drawn around to the side of the pen, as indicated in Fig. 1. The operator can now perform his work, acting upon the base of the horn and destroying the horn germ and severing blood-vessels, so as to cause but little pain to the animal and very small flow of blood. When one horn has been treated, the animal's head is drawn to the other side of the pen, so as to present the other horn to the operator, as will be readily understood.

Having thus described my invention, what I claim, and desire to secure by Letters Patent, is—

The improved apparatus for use in dehorning cattle, comprising the pen having the notched posts J and the cleats G H on its sides, at its upper edges, the belly-band having one end suspended within the pen and its other end provided with means for raising it, the rope F, secured to the cleats G and extended across the pen, near the rear end of the same, the rope O, secured to the cleats H and stretched across the pen, near the front end of the same, the pulley I on the side of the pen, at the rear end of the same, and the rope P, passed around said pulley and provided in front thereof with the ring Q, through which it is passed to form the loops $p\ p'$ and then passed over the notched post J to the rear of the device, substantially as described and shown.

Witness my hand this 28th day of February, 1887.

WM. H. RICHARDS.

Witnesses:
 LOREN SWENSON,
 E. L. McCLOUD.